(12) United States Patent
Palmer (10) Patent No.: US 8,010,450 B2
(45) Date of Patent: Aug. 30, 2011

(54) SYSTEMS AND METHODS FOR PROCESSING COMMERCIAL FINANCIAL TRANSACTIONS

(75) Inventor: Shauna Michelle Palmer, Danbury, CT (US)

(73) Assignee: GE Corporate Finanical Services, Inc., Newark, CT (US)

( * ) Notice: Subject to any disclaimer, the term of this patent is extended or adjusted under 35 U.S.C. 154(b) by 0 days.

(21) Appl. No.: 12/123,241

(22) Filed: May 19, 2008

(65) Prior Publication Data
US 2009/0287593 A1   Nov. 19, 2009

(51) Int. Cl.
G06Q 40/00   (2006.01)
(52) U.S. Cl. .................................................. 705/39
(58) Field of Classification Search .............. 705/39
See application file for complete search history.

(56) References Cited

U.S. PATENT DOCUMENTS

| | | | |
|---|---|---|---|
| 4,634,147 A | 1/1987 | McClure | |
| 5,483,049 A | 1/1996 | Schulze, Jr. | |
| 7,174,319 B2 * | 2/2007 | Johnson | 705/51 |
| 7,181,427 B1 | 2/2007 | DeFrancesco et al. | |
| 7,303,121 B2 | 12/2007 | Martinez | |
| 2001/0047307 A1 * | 11/2001 | Bennett et al. | 705/26 |
| 2002/0059107 A1 * | 5/2002 | Reich et al. | 705/26 |
| 2002/0194118 A1 * | 12/2002 | Nassar | 705/38 |
| 2003/0023528 A1 * | 1/2003 | Wilce et al. | 705/35 |
| 2003/0126011 A1 | 7/2003 | Bryman et al. | |
| 2005/0010506 A1 * | 1/2005 | Bachann | 705/35 |
| 2005/0125336 A1 * | 6/2005 | Rosenblatt et al. | 705/39 |
| 2005/0131820 A1 * | 6/2005 | Rodriguez et al. | 705/42 |
| 2006/0015454 A1 * | 1/2006 | Hahn-Carlson | 705/39 |
| 2007/0233573 A1 * | 10/2007 | Wang et al. | 705/26 |
| 2007/0284433 A1 * | 12/2007 | Domenica et al. | 235/379 |
| 2008/0208760 A1 * | 8/2008 | Keithley | 705/75 |

OTHER PUBLICATIONS

Diligent Credit Vovernance for a Competitive Marketplace by Alice Shepherd. The RMA Journal, Philadephia; May 2007. vol. 89 Iss. 8; p. 22,—7 pages.*
Treasury Resources @ PhoenixHech.com ; "Fraud in the 21st Century", A Corporate Payment Perspective by Gerald Stephens of Bank of America. p. 1-34 at 2005 expo.*
Cotu pf San Diego: Police Department: Tips for business: Check and Credit Card Fraud—4 pgs at www.sandiego.bove/police/prevention 2006.*
HESC: New York State Higher Education Services: 6 pages—Frequently asked questions at www.hesc.com/Content.nsf/L/3/Frequently_Asked_Questions_Loan_Origination_Delivery_Disbursement_and_Servicing.*
Factoring Co. Purchase Order Financing Explained at www.factoring-company.us/purchase-order-financing-explained.html—7 pages.*

* cited by examiner

*Primary Examiner* — Shahid Merchant
*Assistant Examiner* — Mary Gregg
(74) *Attorney, Agent, or Firm* — Armstrong Teasdale LLP (57) ABSTRACT

Systems and methods for processing commercial financial transactions are provided. In one aspect, a method for processing a commercial financial transaction between a customer and a merchant is provided. The method includes approving a customer for receiving a financing package for engaging in the commercial financial transaction with a merchant, and issuing the financing package to the customer from the originator, wherein the financing package includes a check having a plurality of security features and a security agreement between the customer and the originator. The method also includes entering into a financing agreement between the customer and the originator upon execution of the check and the security agreement, receiving first purchase data from the merchant, performing an initial verification of the commercial financial transaction including comparing stored financing package data to the first purchase data, and processing the commercial financial transaction if the initial verification is satisfied.

44 Claims, 7 Drawing Sheets

SYSTEMS AND METHODS FOR PROCESSING COMMERCIAL FINANCIAL TRANSACTIONS

BACKGROUND OF THE INVENTION

The field of the invention relates generally to systems and methods for processing commercial financial transactions and, more specifically, to systems and methods for processing commercial financial transactions that includes processing transaction data and a check used for payment, wherein the check is provided to a customer that is approved by a check originator.

When purchasing capital, such as a vehicle and/or other types of equipment, a commercial customer may pay the purchase price of the capital in a variety of ways. For example, the customer may use cash to pay the full purchase price. Alternatively, the customer may use a check drawn on a bank account held by the customer. Either of these payment methods enables the customer to avoid entering into a financing arrangement with the merchant or a lender.

At least some commercial equipment purchases require loans to the customer. A typical process for approving a customer for such a loan requires the customer to spend valuable time on preparing loan application paperwork, which is submitted to a potential lender. The lender must then evaluate the loan request, which often times results in significant delays in getting the equipment. Furthermore, the loan paperwork often times requires the customer to disclose business information, such as profits and/or losses during a particular period and/or capital currently owned by the customer.

At least some lenders offer customer convenience checks that are linked to an existing credit account held by the customer at the lender. The customer presents a convenience check in the same manner as a conventional check. However, the funds used to repay the lender are not withdrawn from an account, as is done for a conventional check. Rather, the funds are credited to an outstanding credit account balance of the customer's credit account. These types of convenience checks are currently only used by customers having an existing credit account with the lender. Moreover, these convenience checks are tied to the personal credit of the customer rather than to the commercial credit of a commercial customer. Additionally, these known convenience checks fail to include security features.

At least some banks also offer partnership checks to existing credit account holders for use in consumer financial transactions between the account holders and one or more preselected merchants. However, such banks use systems that require consumers to take certain actions prior to using an issued partnership check, such as presenting the partnership check to the bank and/or calling to inform the bank of an acceptance of the terms of the partnership check. Further, such systems process partnership checks in the same manner as standard consumer checks, with the check being processed by the bank that issued the check after being presented at a merchant bank of deposit. Therefore, spotting fraudulent activity by either the consumer or the merchant may be delayed.

Accordingly, these known uses of convenience checks and partnership checks have significant limitations, and do not enable a commercial customer that is already approved for a loan amount to purchase a product from a merchant with a check having a plurality of security features included therewith.

BRIEF DESCRIPTION OF THE INVENTION

In one aspect, a method for processing a commercial financial transaction between a customer and a merchant is provided. The commercial financial transaction includes a check used by the customer for making a purchase from the merchant. The method includes approving a customer, by an originator, for receiving a financing package for engaging in a commercial financial transaction with a merchant, issuing the financing package to the approved customer from the originator, wherein the financing package includes a check having a plurality of security features and a security agreement between the customer and the originator associated therewith, and storing financing package data within a database. The method also includes entering into a financing agreement between the customer and the originator upon the customer executing the check and the security agreement to engage in the commercial financial transaction with the merchant, receiving, at a computer, first purchase data from the merchant, wherein the first purchase data includes data relating to the executed security agreement, the executed check, and a product or service purchased by the customer, performing an initial verification of the commercial financial transaction including comparing the financing package data to the first purchase data, and processing the commercial financial transaction if the initial verification is satisfied.

In another aspect, a network-based system for processing a commercial financial transaction between a customer and a merchant is provided. The commercial financial transaction includes a check used by the customer for making a purchase from the merchant. The system includes a client system, a database for storing information, and a server system configured to be coupled to the client system and the database. The server system is configured to generate a list of approved customers for receiving a financing package for engaging in a commercial financial transaction with a merchant wherein a financing package is issued to an approved customer included in the list of approved customers and the financing package includes a check having a plurality of security features and a security agreement between the customer and an originator of the financing package, and store the financing package data within the database. The server system is also configured to receive first purchase data from a merchant upon the customer executing the check and the security agreement to engage in the commercial financial transaction with the merchant, perform an initial verification of the commercial financial transaction that includes a comparison of the financing package data with the first purchase data, and process data relating to the commercial financial transaction if the initial verification is satisfied.

In another aspect, a computer coupled to a database for processing a commercial financial transaction between a customer and a merchant is provided. The commercial financial transaction includes a check used by the customer for making a purchase from the merchant. The computer is programmed to generate a list of approved customers for receiving a financing package for engaging in a commercial financial transaction with a merchant wherein a financing package is issued to an approved customer included in the list of approved customers and the financing package including a check having a plurality of security features and a security agreement between the customer and an originator of the financing package, and store the financing package data within the database. The computer is also programmed to receive first purchase data from a merchant upon the customer executing the check and the security agreement to engage in the commercial financial transaction with the merchant, perform an initial verification of the commercial financial transaction that includes a comparison of the financing package data with the first purchase data, and process data relating to the commercial financial transaction if the initial verification is satisfied.

In another aspect, a computer program embodied on a computer readable medium for processing a commercial financial transaction between a customer and a merchant is provided. The commercial financial transaction includes a check used by the customer for making a purchase from the merchant. The computer program includes at least one code segment that generates a list of approved customers for receiving a financing package for engaging in a commercial financial transaction with a merchant wherein a financing package is issued to an approved customer included in the list of approved customers and the financing package includes a check having a plurality of security features and a security agreement between the customer and an originator of the financing package, and stores the financing package data within a database. The computer program also includes at least one code segment that receives first purchase data from a merchant upon the customer executing the check and the security agreement to engage in the commercial financial transaction with the merchant, performs an initial verification of the commercial financial transaction that includes a comparison of the financing package data with the first purchase data, and processes data relating to the commercial financial transaction if the initial verification is satisfied.

DETAILED DESCRIPTION OF THE INVENTION

As used herein, a customer is typically a business. Customers may purchase products such as commercial equipment for their businesses from merchants. These customers may utilize the checks and processes described herein, which are offered by an originator, to purchase products from the merchants. In these cases, the customer that executes one of the checks described herein is essentially borrowing the funds from the originator to purchase the product from the merchant. Accordingly, the customer could also be referred to as a borrower, and the originator as a lender to the customer. A customer may be an existing customer of the merchant and/or an existing customer/borrower/account holder of the originator, or the customer could be a prospective customer of at least one of the merchant and originator. As such, the term "customer" as used herein is intended to include existing customers and/or prospective customers of either the merchant or the originator, or both.

As used herein, a check originator, or simply an originator, is typically a business that approves customers for checks that are used as described herein. An originator is oftentimes a financial institution that is in the business of lending money to other businesses. Moreover, an originator bank, as used herein, is typically a bank that works cooperatively with the originator to fund commercial transactions in which checks are used as described herein. In addition, an acquiring bank is typically a bank at which a merchant, vendor, and/or dealer holds an account. As such, an acquiring bank may also be referred to as a merchant bank. In at least some cases, the originator bank and the acquiring bank may be the same entity. In at least some cases, the originator and the originator bank may be the same entity.

The systems and processes described herein are directed to commercial transactions, but are not necessarily so limited. A commercial transaction includes any business transactions or dealings between parties that are engaged in business, as opposed to individuals engaging in personal or consumer type transactions.

As used herein, a processor may include any programmable system including systems using microcontrollers, reduced instruction set circuits (RISC), application-specific integrated circuits (ASICs), logic circuits, and/or any other circuit or processor capable of executing the functions described herein. The above examples are exemplary only, and are thus not intended to limit in any way the definition and/or meaning of the term "processor."

As used herein, financing package data refers to information relating to a financing package issued by an originator to a customer for use in a commercial financial transaction, as described below. Financing package data includes, for example, a maximum check amount, a stale date, and/or loan repayment terms associated with a check and a security agreement that are included in the financing package.

As used herein, first purchase data refers to information relating to a commercial financial transaction, wherein the information is transmitted by a merchant to an originator, and by the originator to an originator bank. The first purchase data may include, for example, a payee name, a check amount, and/or an issue date. The first purchase data is compared to the financing package data to facilitate preventing fraudulent activity. Similarly, as used herein, second purchase data refers to information relating to the commercial financial transaction that is acquired from a scanned image of the check used in the transaction and/or the actual check, after the check has been presented by the merchant to an acquiring bank and processed by a clearing house and/or a Federal Reserve Bank. Second purchase data may include, for example, a payee name, a check amount, and/or an issue date. The second purchase data is compared to the first purchase data to further facilitate preventing fraudulent activity.

Described in detail herein are exemplary embodiments of systems and methods that enable an approved customer to use a check to pay for a commercial transaction with a merchant. The check funds are drawn from an account and are repaid by the customer over a specified term at a specified rate. The account is held by the check originator at an originator bank. As such, the funds are initially paid by the originator in the form of a loan to be repaid by the customer. In other words, in the exemplary embodiment, the originator has an account with an originator bank, wherein funds are loaned from this account to the customer and the originator bank is reimbursed by the originator such that the originator is the lender of the funds to the customer.

Moreover, the systems and methods described herein facilitate processing such commercial transactions. A check transaction or, alternatively, a commercial transaction, as referred to herein includes a payment transaction wherein a commercial customer makes a purchase using a check drawn on a pre-established credit account as payment to a merchant. The systems and methods facilitate, for example, enabling an approved commercial customer to purchase an item of capital from a merchant using a check, wherein use of the check enters the customer into a financing agreement with a check originator. A technical effect of the systems and methods described herein include at least one of (a) prospecting for potential customers by extracting customer data from market intelligence such as information submitted by a plurality of merchants and/or obtained from public transaction databases, and/or obtaining customer data through customer inquiries made in relation to a product and/or service; (b) using the customer data to compile a customer database, and using the customer data to approve a plurality of customers to receive a check for use at a merchant in a commercial financial transaction; (c) generating and issuing, to each approved customer, a financing package that includes a check having a plurality of security features to prevent fraudulent activity, including, for example, a preselected maximum check amount that may be drawn on the credit account, a preselected stale date, and/or an identifier that specifically identifies the capital being purchased; (d) transmitting financing package data from the originator to an originator bank; (e) executing, by the customer, the check during a commercial financial transaction with a merchant; (f) transmitting, by the merchant, first purchase data relating to the transaction to the originator; (g) transmitting, by the originator, the first purchase data to the originator bank; (h) comparing, by the originator bank, the first purchase data to the financing package data and transmitting an exception message to the originator if the comparison fails; (i) presenting, by the merchant, the executed check to an acquiring bank at which the merchant holds an account; (j) processing the presented check by the acquiring bank such that the originator bank receives second purchase data representative of the check for approval of the transaction; (k) comparing, by the originator bank, the first purchase data to the second purchase data; (l) approving the transaction and release of payment funds to the merchant based on the originator bank comparison; and (m) making payments, by the customer, to the originator over a specified term at a specified interest rate.

In one embodiment, a computer program is provided, and is embodied on a computer readable medium. The program utilizes a Structured Query Language (SQL) with a client user interface front-end for administration and a web interface for accepting standard user inputs and generating reports. In an exemplary embodiment, the system is fully accessible by individuals having authorized access outside a firewall of a business-entity through the Internet. In an alternative embodiment, the system is web-enabled and is run on a business entity intranet. In a further alternative embodiment, the system is run in a Windows® environment (Windows is a registered trademark of Microsoft Corporation, Redmond, Wash.). The application is flexible and designed to run in various different environments without comprising any major functionality.

Figure 1:
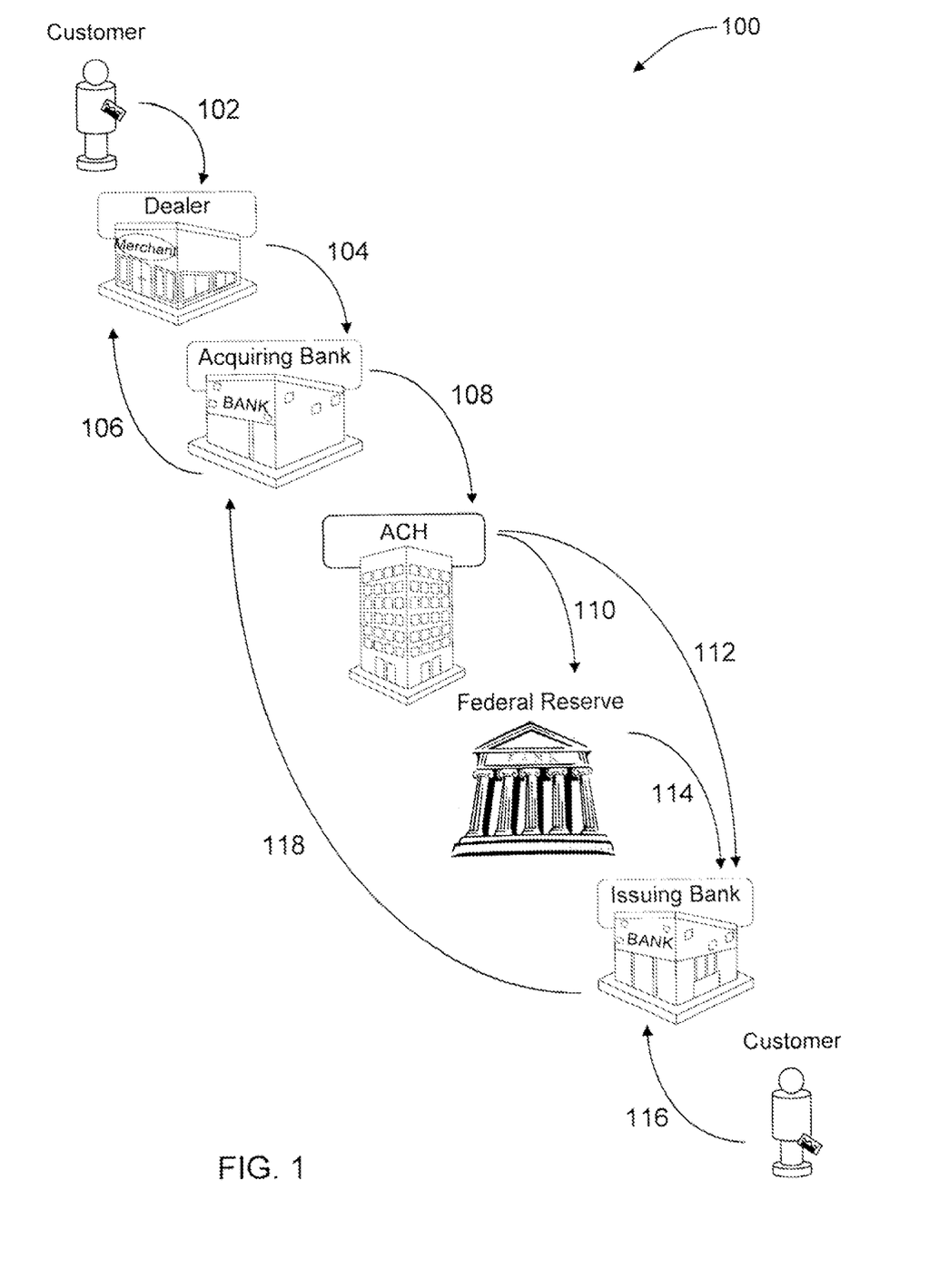
FIG. 1 is a flowchart illustrating a known process for processing a check transaction.

FIG. 1 is a flowchart 100 illustrating a known process for processing a check transaction, such as a commercial check transaction. A check is typically a written order from one person (the payor) to another (the payee), signed by the payor, and requiring the bank at which the payor holds a checking account to pay on demand or at some fixed future date, a certain sum of money, to either the person identified as payee or to any person presenting the check, such as the bank at which the payee holds an account. Flowchart 100 shows a customer paying 102 a bill of sale at a merchant using a check. In such a case, the customer is considered the payor and the merchant is the payee. Generally, the customer also provides the merchant with identification and/or contact information in case a check is returned as nonpayable. The merchant then deposits 104 the check to an acquiring bank, which is a bank at which the merchant holds an account. Typically, at the end of the business day, the merchant deposits 104 the check, along with all other checks received that day. After the acquiring bank posts 106 the value of the check to the merchant's account, the acquiring bank sends 108 the check to an automated clearing house (ACH). One example of an automated clearing house is the National Automated Clearing House Association (NACHA). The ACH sorts all received checks according to an issuing bank, which is a bank at which the customer holds an account. The ACH also scans each check to generate an electronic image and electronically transmits 110 the electronic images to a Federal Reserve Bank. The ACH also sends 112 the paper checks to the issuing bank associated with the account on which the check was drawn. The Federal Reserve Bank receives the electronically transmitted check images from the ACH and, in turn, electronically transmits 114 the images to the issuing bank associated with each check. The issuing bank then debits 116 the customer's account held at the issuing bank and transfers 118 the check amount to the acquiring bank.

Figure 2:
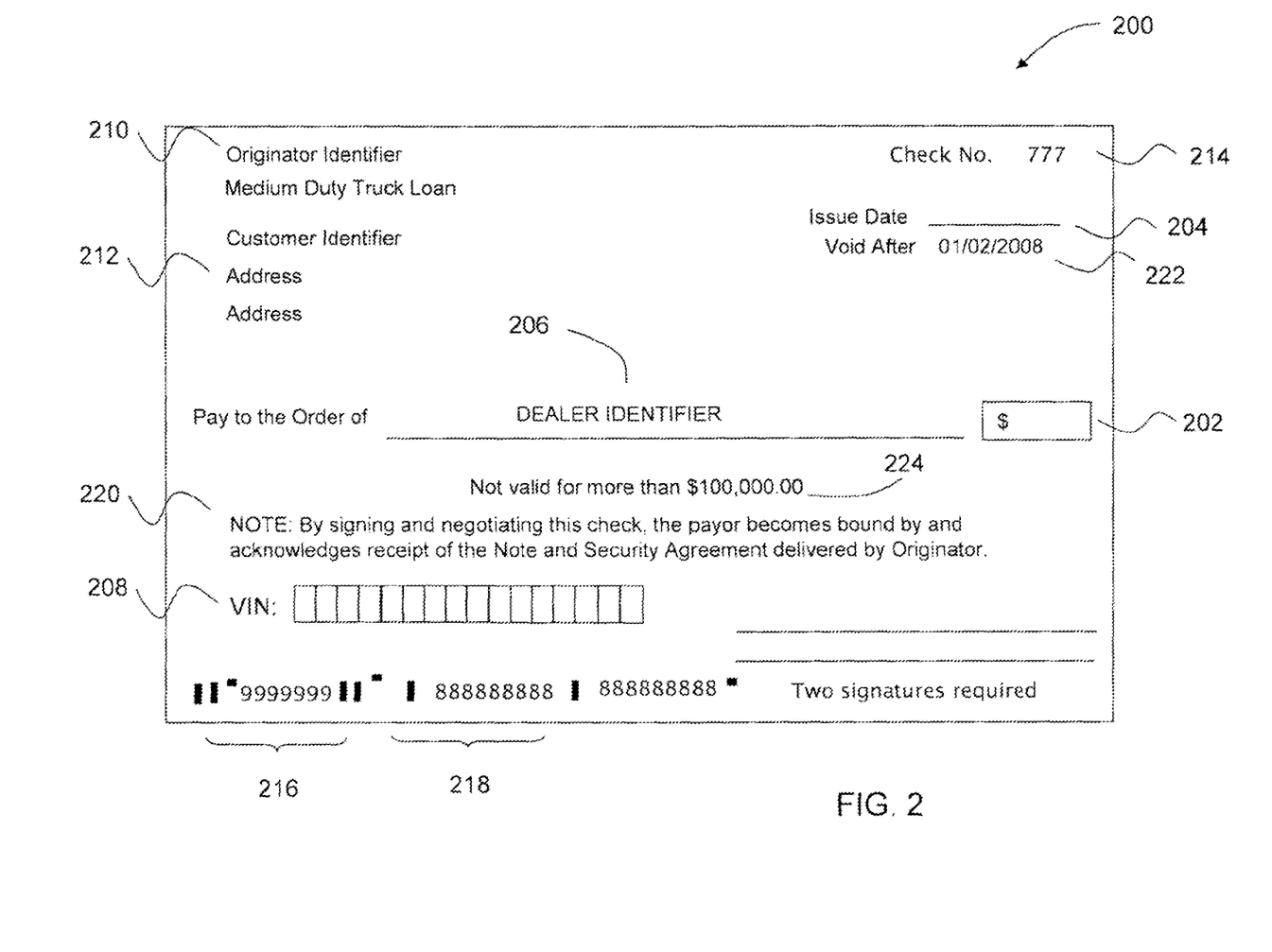
FIG. 2 is a schematic of a check that may be used in a commercial financial transaction in accordance with one embodiment of the present invention.

FIG. 2 is a schematic of a check 200 that may be used in a commercial financial transaction. Check 200 includes data relating to the transaction, data relating to the credit account the customer holds at an originator bank, described in more detail below, and a plurality of security features. Transaction-related data includes, for example, a transaction amount 202, which, in the exemplary embodiment, is blank at the time of release to the customer and is filled in by the customer at the time of the transaction. Check 200 also includes a transaction date data field 204 and a payee data field 206. In one embodiment, payee data field 206 designates the merchant at which the check is to be executed. In another embodiment, payee data field 206 is blank at the time of release to the customer and is filled in by the customer at the time of the transaction. Check 200 also includes an identifier 208 for the goods being purchased. Account-related data includes, for example, an originator identifier 210, a customer identifier 212, a check number 214, an originator bank routing number 216, and an account number 218. Check 200 also includes a security agreement 220 that, upon execution by the customer, obligates the customer to repay to the originator the transaction amount. Security agreement 220 also establishes for the originator a security interest in the goods being purchased, and evidences agreement to the terms and conditions of the security agreement as represented by the customer's signature.

The security features of check 200 include both security features on the physical check, paper stock inventory controls, and bank account controls. One example of a physical security feature is a stale date 222, or void after date. If the customer attempts to use the check after the stale date has passed, the check will be refused. Additional examples of the physical security features include (a) a void pantograph, which displays "VOID" if check 200 is photocopied, (b) a warning band around the perimeter of check 200 that refers to the physical security features, and/or (c) a padlock icon, which refers to security features on a back of check 200. Further examples of security features include (d) chemical sensitivity, such as a brownstain reaction inherent in the paper, (e) one or more watermarks, (f) hairline fibers embedded in the paper and viewable under florescent light, and/or (g) one or more control numbers printed on the back of check 200. Additional examples of security features include (h) prismatic printing, (i) microprint font borders and lines having microprint details that do not appear in photocopies, (j) security paper that loses its coloration if abrasives are used to alter printing, and/or (k) toner grip, which improves adherence of print toner used on the paper. Examples of paper stock inventory controls include a preprinted sequential number that is printed on the back of check 200 and/or segregation of check stock from other inventory.

An example of a bank account control is exception warnings that are generated by the originator bank and transmitted to the originator when transaction information, such as a check number, check amount, and/or merchant identifier, which is submitted to the originator and transmitted by the originator to the originator bank, does not match transaction information drawn from the presented check. Such exception warnings, generated when financing package data is compared to first purchase data, and when first purchased data is compared to second purchase data, enable an originator bank and/or originator to spot possible fraudulent activity. For example, attempts to alter a check amount after the check has been executed by the customer, and prior to the first purchase data being sent by the merchant to the originator, may be caught and flagged as an exception when the first purchase data is compared to the second purchase data and/or financing package data. It should be apparent to one of ordinary skill in the art that additional security features, inventory controls, and/or bank account controls may be used in combination with the above features or in place of the above features.

More specifically, one example of a bank account control is controlled disbursement of funds into and out of an account held by the originator at the originator bank. Funds used to pay merchants are transferred into the account daily, rather than requiring the originator to maintain a substantial balance in the account. Another example of a bank account control is a full account reconcilement, in which the originator provides the originator bank with information relating to checks that have been issued to customers, such as the financing package data described herein. The originator bank then provides the originator with reconcilement reports that reconcile beginning and ending balances and identifies each item as paid, outstanding, canceled, stopped, or as an exception. A third example of a bank account control is stale date control, as described above. If a customer attempts to use the check after the stale date, the originator bank transmits an exception to the originator such that the originator may further review the transaction.

Another example of a bank account control is a maximum check amount 224. In one embodiment, maximum check amount 224 is set by the originator as a constraint on the account held by the originator at the originator bank. If an executed check is presented for greater than the amount designated by the originator, the originator bank will transmit an exception message to the originator. The originator may then reject the transaction or further review the transaction. In an alternative embodiment, maximum check amount 224 is determined on a per-customer basis according to, for example, a risk score that is determined for each customer, as described below. If an executed check is presented for greater than the amount designated by the originator for the particular customer to which the check was issued, the originator bank will transmit an exception message to the originator. The originator may then reject the transaction or further review the transaction.

Yet another example of a bank account control is a daily report from the originator bank to the originator, including exception items generated by the originator bank after, for example, a comparison of financing package data to first purchase data or a comparison of first purchase data to second purchase data. Still another example of a bank account control is uploading issued check information to the originator bank's teller system to alert banking center staff of potentially fraudulent items presented over the counter. Comparison of the financing package data, such as check number and dollar amount, to the first purchase data is performed upon scanning the item. Another example is an examination by the originator bank of the payee name, included in the second purchase data, by comparing it to the first purchase data to determine if the payee has been altered. A further example of a bank account control is an ability of the originator to manage the bank account held by the originator at the originator bank online, by manually entering checks to their issue files, place stop payments, voids, cancels, perform paid item inquiries, view online statements, and/or view check images.

Figure 3:
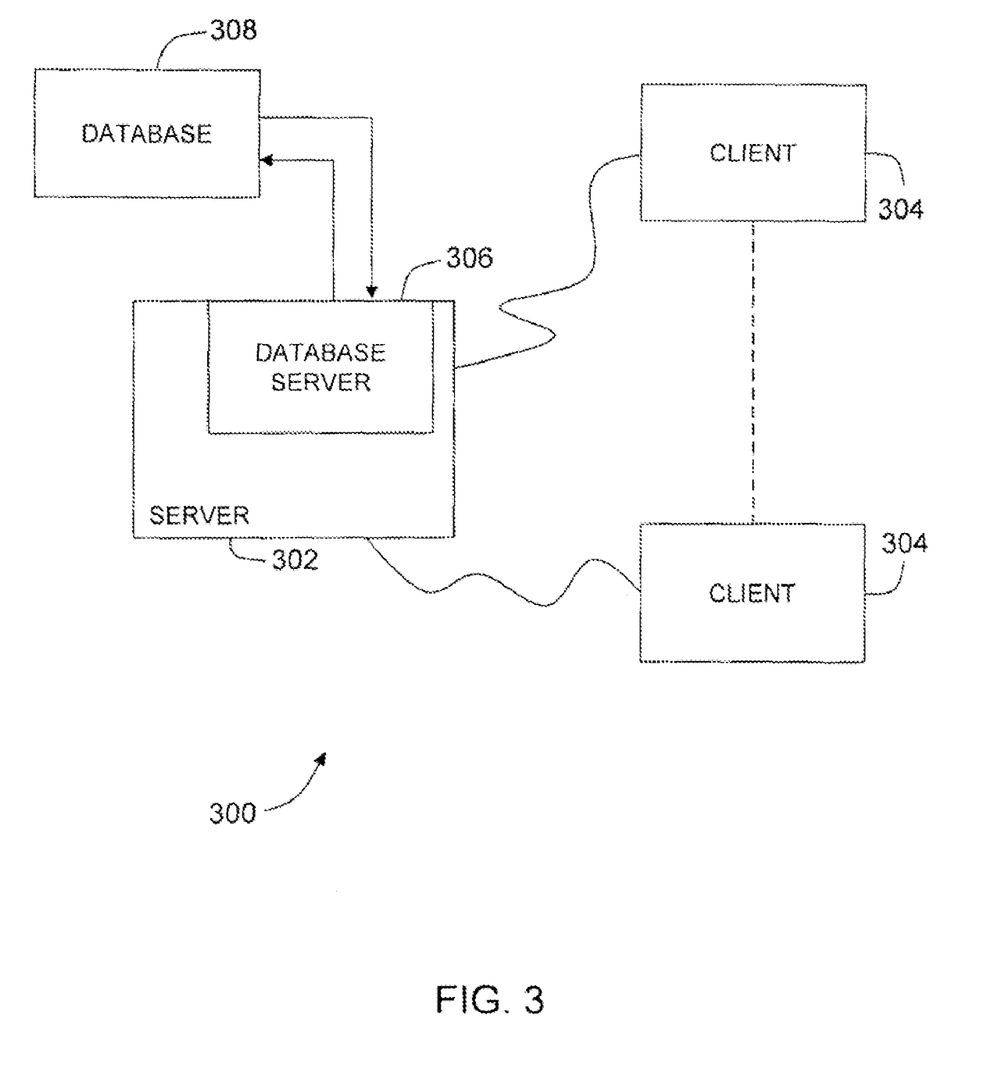
FIG. 3 is a simplified block diagram of an exemplary system that may be utilized to process commercial financial transaction payments using the check shown in FIG. 2.

FIG. 3 is a simplified block diagram of an exemplary system 300 in accordance with one embodiment of the present invention. In one embodiment, system 300 may be utilized for processing commercial financial transaction payments using check 200 (shown in FIG. 2). More specifically, in the exemplary embodiment, system 300 includes a server system 302 and a plurality of client sub-systems, also referred to as client systems 304, connected to server system 302. In one embodiment, client systems 304 are computers including a web browser, such that server system 302 is accessible to client systems 304 using the Internet. Client systems 304 are interconnected to the Internet through may interfaces including a network, such as a local area network (LAN) and/or a wide area network (WAN), dial-in connections, cable modems, wireless connections, and special high-speed ISDN lines. Client systems 304 may be any device capable of interconnecting to the Internet including a web-based phone, personal digital assistant (PDA), or other web-connectable equipment. A database server 306 is connected to a database 308 containing information on a variety of matters, as described below in greater detail. In one embodiment, database 308 is stored on server system 302 and may be accessed by potential users at one of client systems 304 by logging onto server system 302 through one of client systems 304. In any alternative embodiment, database 308 is stored remotely from server system 302 and may be non-centralized.

As discussed below, check information including account numbers, stale dates, and payment tracking information, is stored within database 308. Data relating to the customer and/or the merchant may also be stored within database 308 including financing package data, first purchase data, and/or second purchase data. Information stored in database 308 may also be utilized when determining customers for approval of receiving the checks discussed herein.

Figure 4:
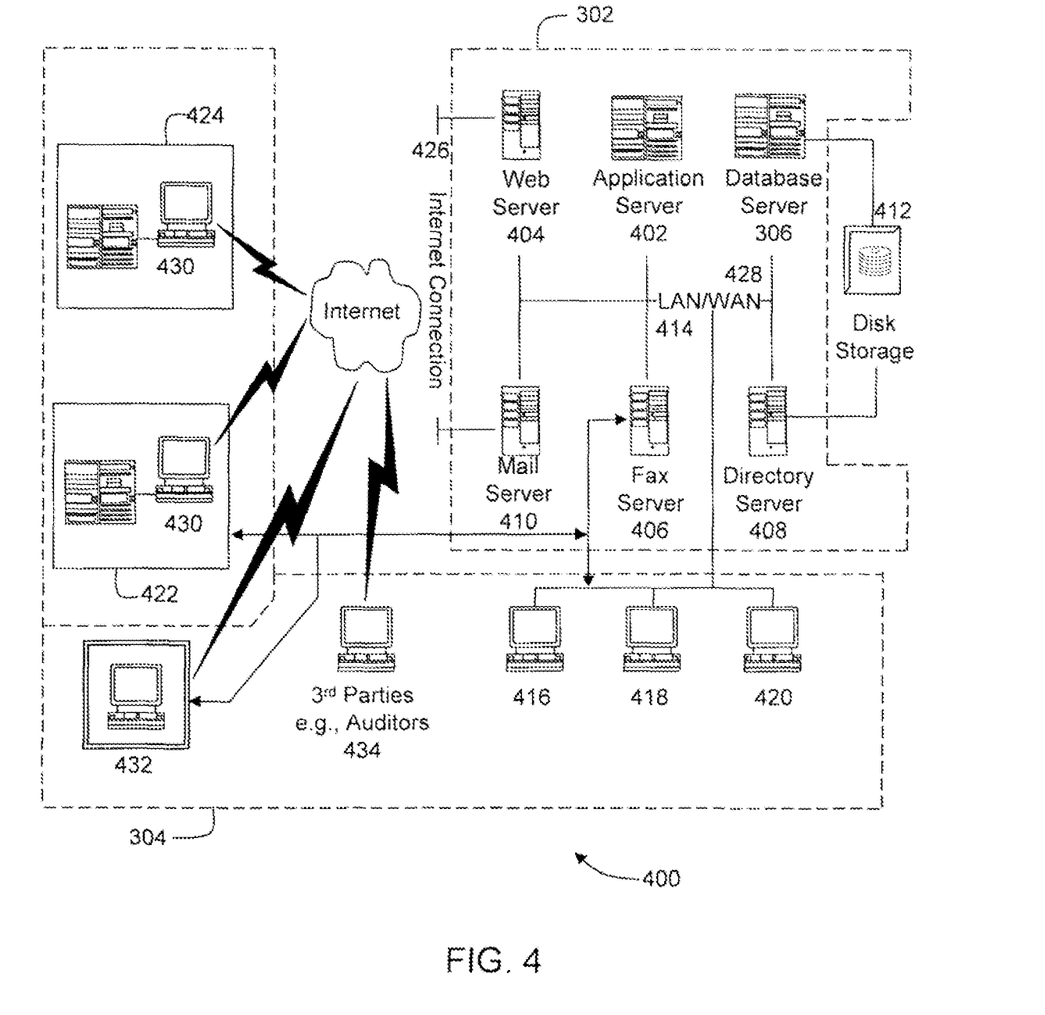
FIG. 4 is an expanded block diagram of an exemplary embodiment of a server architecture of a system in accordance with one embodiment of the present invention.

FIG. 4 is an expanded block diagram of an exemplary embodiment of a server architecture of a system 400 in accordance with one embodiment of the present invention. Components in system 400, identical to components of system 300 (shown in FIG. 3), are identified in FIG. 4 using the same reference numerals used in FIG. 3. System 400 includes server system 302 and client systems 304. Server system 302 further includes database server 306, an application server 402, a web server 404, a fax server 406, a directory server 408, and a mail server 410. A disk storage unit 412 is coupled to database server 306 and directory server 408. Servers 306, 402, 404, 406, 408, and 410 are coupled in a local area network (LAN) 414 that, in one embodiment, is part of an originator intranet. In addition, a system administrator's workstation 416, a user workstation 418, and a supervisor's workstation 420 are coupled to LAN 414. Alternatively, workstations 416, 418, and 420 are coupled to LAN 414 using an Internet link or are connected through an intranet.

Each workstation, 416, 418, and 420, is a personal computer having a web browser. Although the functions performed at the workstations typically are illustrated as being performed at respective workstations 416, 418, and 420, such functions can be performed at one of many personal computers coupled to LAN 414. Workstations 416, 418, and 420 are illustrated as being associated with separate functions only to facilitate an understanding of the different types of functions that can be performed by individuals having access to LAN 414.

Server system 302 is configured to be communicatively coupled to various entities, including a merchant bank server 422 and an originator bank server 424, and to third parties, e.g., auditors, 434 using an Internet connection 426. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 428, local area network 414 could be used in place of WAN 428.

In the exemplary embodiment, any authorized individual or entity having a workstation 430 may access system 400. At least one of the client systems includes a merchant workstation 432 located at a merchant location. Workstations 430 and 432 are personal computers having a web browser. Also, workstations 430 and 432 are configured to communicate with server system 302. Furthermore, fax server 406 communicates with remotely located client systems and/or workstations, including merchant workstation 432, using a telephone link. Fax server 406 is configured to communicate with other client systems 416, 418, and 420 as well.

Figure 5:
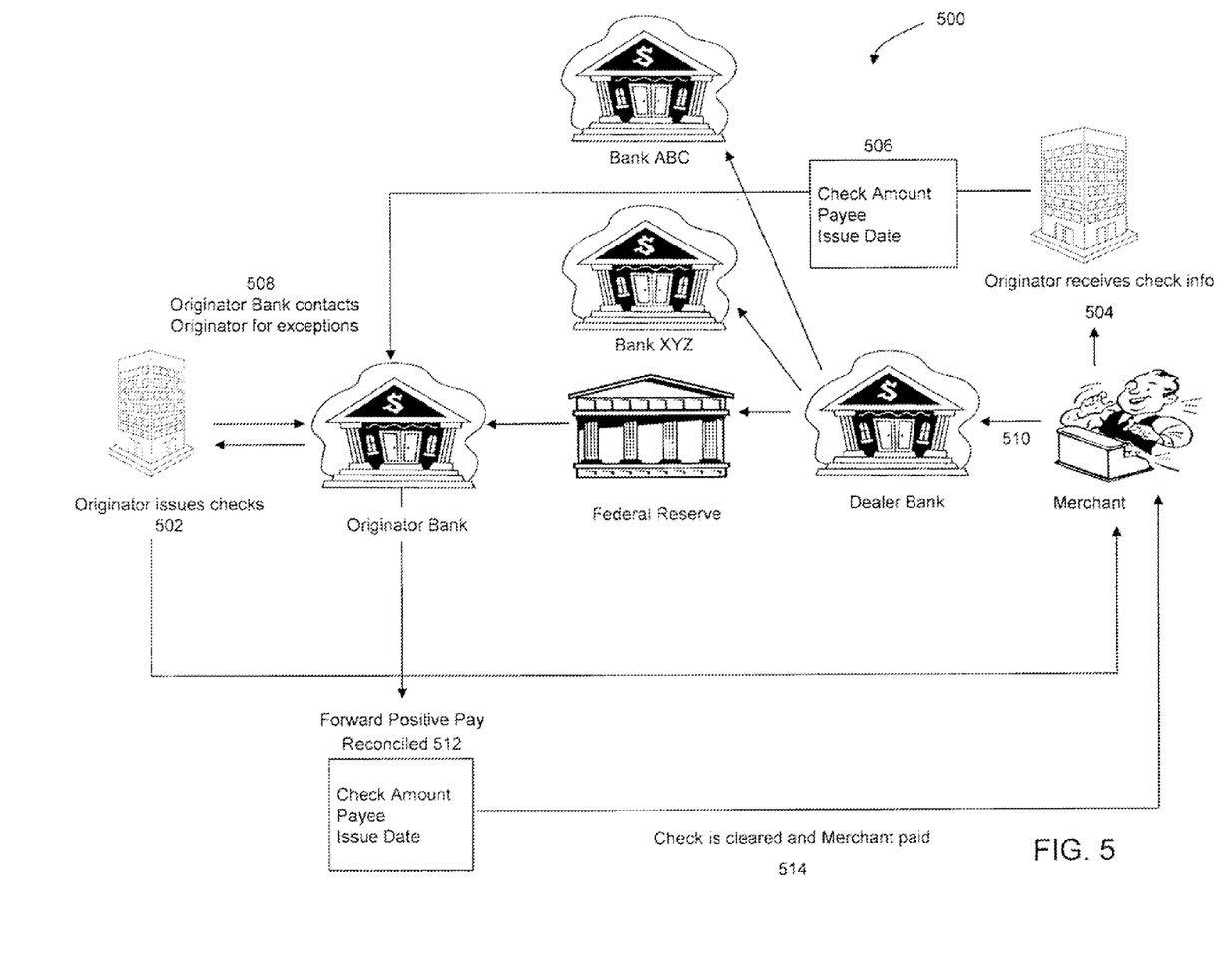
FIG. 5 is a simplified flowchart illustrating an exemplary process utilized by the system shown in FIG. 4 for processing a commercial financial transaction.

FIG. 5 is a simplified flowchart 500 illustrating an exemplary process utilized by system 400 (shown in FIG. 4) for processing a commercial financial transaction using a check, such as check 200 (shown in FIG. 2). An originator uses data stored in a database to approve each of a plurality of customers. The originator issues 502 a financing package, including a check, to each approved customer. In the exemplary embodiment, a customer that is approved for receiving a financing package is not required to submit any additional information to the originator or originator bank for final approval. Rather, the customer is approved for receiving the check and the loan associated therewith that is included within the financing package. The check includes a plurality of security features, as described above. Each check is associated with an account at an originator bank and each account has a maximum amount that is available to the customer for use in a commercial financial transaction with a merchant. The originator also transmits financing package data to the originator bank, including the maximum amount and a stale date by which the check must be executed by the customer. The customer executes the check in order to purchase commercial equipment from the merchant. When executing the check, the customer also executes a security agreement that signifies the customer's agreement to the terms of repayment funds to the originator.

The dealer then transmits 504 information, such as first purchase data, relating to the check to the originator. The information includes, for example, the security agreement, the check amount, the payee, and a date of issue. The originator then transmits 506 the first purchase data to the originator bank. The originator bank compares the first purchase data to the financing package data. For example, the originator bank compares the check amount to a maximum account amount and notifies 508 the originator of any exceptions. For example, the originator bank may notify the originator that the executed check is for an amount that is greater than the maximum account amount. The originator may then reject the transaction or allow the transaction to proceed.

After transmitting the information relating to the check to the originator, the merchant presents 510 the check to an acquiring bank at which the merchant holds an account. The check is processed as described above in FIG. 1. For example, the acquiring bank sends the check to an automated clearing house for sorting and scanning, such as another bank and/or a Federal Reserve Bank. The clearing house then sends the check and/or second purchase data to the originator bank for approval.

The originator bank compares 512 the first purchase to the second purchase data. For example, the originator bank compares the check amount, payee, and/or check issue date received from the originator to the same elements on the check received from the clearing house. If one or more such comparisons fails, the originator bank notifies 508 the originator of the discrepancy. The originator may decide to reject the transaction or may allow the transaction to proceed. The originator bank also compares the check issue date to a stale date designated by the originator, and notifies 508 if the check was not executed prior to the stale date. The originator may decide to reject the transaction or may allow the transaction to proceed. If the originator bank successfully reconciles the check information received from the originator with the check received from the clearing house, the check is cleared 514 and funds equal to the transaction price are paid to the merchant.

Figure 6:
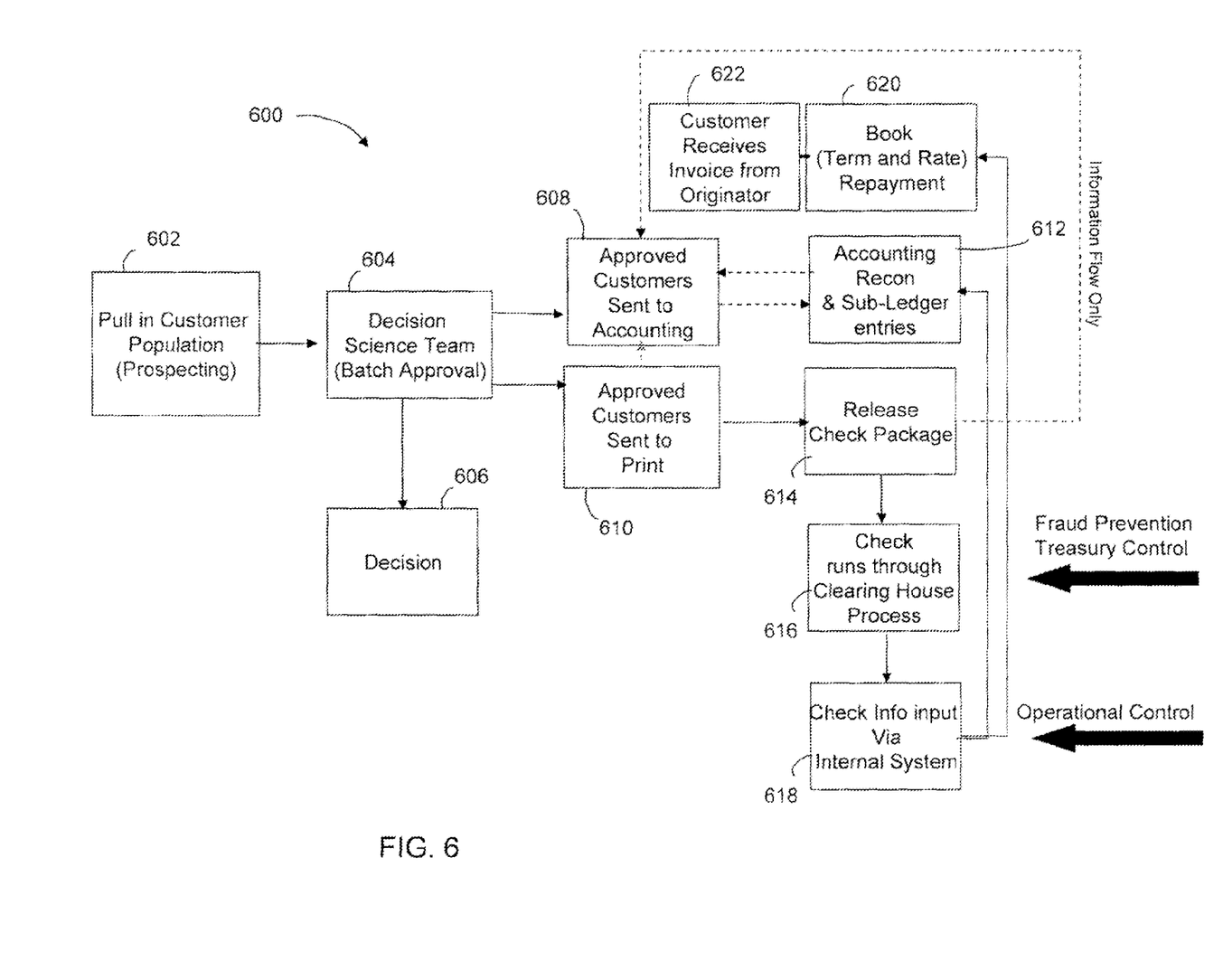
FIG. 6 is a flowchart further illustrating the process shown in FIG. 5.

FIG. 6 is a flowchart 600 illustrating a high-level overview of an exemplary process utilized by system 400 (shown in FIG. 4) for processing a commercial financial transaction using a check, such as check 200 (shown in FIG. 2). An originator determines 602 a customer list, including data relating to each customer in the list, using market intelligence such as information submitted by a plurality of merchants, information obtained from public transaction databases, and/or obtaining customer data through customer inquiries made in relation to a product and/or service. For example, customers may enter customer data in a website when inquiring about a product and/or service. The customers in the customer list may be existing customers of the originator or new customers. An approval or rejection is made 604 for each customer in the customer list based on the data included in the customer list. The decision to approve or reject may be based on, for example, a risk score generated for each customer based on the data in the customer list. The decision to approve or reject each customer may then be stored 606 in a database, such as on database server 306 (shown in FIG. 4).

Files for each approved customer is then sent 608 to an accounting department and/or program in system 400. In addition, a check package is generated and printed 610 for each approved customer. A check log is generated during check package generation, and the check log is used to create 612 an account for each approved customer with the originator. The check log is also sent to the originator bank. The check package is then released 614 to the customer for which it was printed.

The customer executes a check and a security agreement included in the check package to finance a commercial transaction with a merchant. The check is processed 616 after being presented by the merchant to a merchant bank as described above. The merchant also sends information relating to the commercial transaction to the originator, and the originator inputs 618 the information into the originator bank. The account is then updated to reflect the purchase made by the customer using the check. In addition, the term of repayment and the interest rate associated with the repayment are selected 620 by the originator. Thereafter, the customer receives 622 regular invoices from the originator. The customer repays the originator for the amount of the commercial transaction plus interest.

Figure 7:
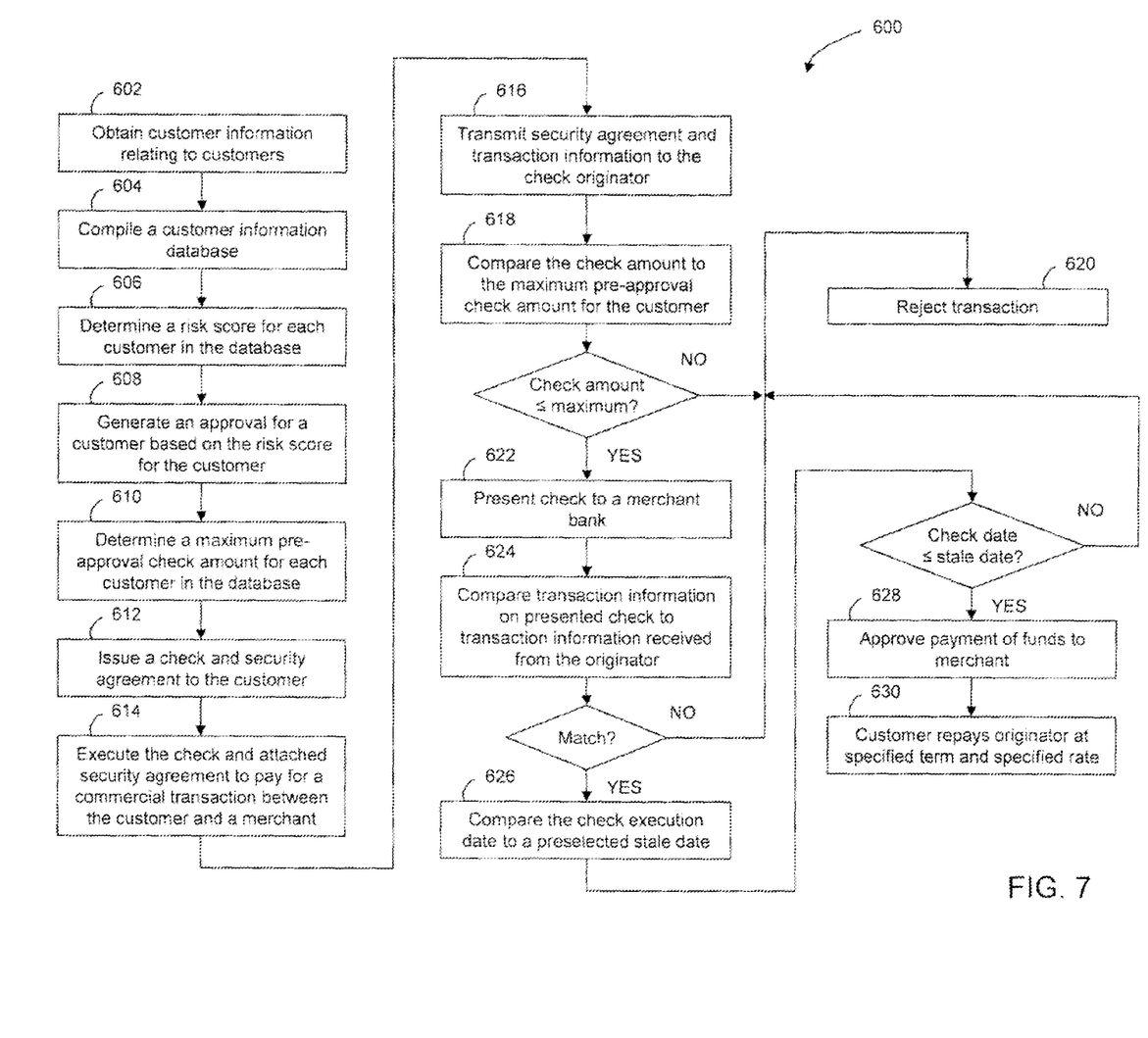
FIG. 7 is a flowchart further illustrating an exemplary method for processing a check-based commercial transaction between a customer and a merchant and financed by an originator using the system shown in FIG. 4.

FIG. 7 is a flowchart 700 illustrating an exemplary method for processing a check-based commercial transaction between a customer and a merchant and financed by an originator. In the exemplary embodiment, system 400 may be utilized by the originator that approves the customer, an originator bank that compares transaction information and approves or rejects the transaction and/or approves or rejects payment of funds to the merchant. In the exemplary embodiment, and referring to FIGS. 3 and 4, system 400 facilitates processing a commercial transaction between a customer and a merchant. An originator first obtains 702 customer information relating to a plurality of customers. The customer information may be obtained by the originator using a variety of methods. One example is by submission of customer information by dealers through a website. For example, merchants submit customer information such as contact information, information relating to known collateral, and/or information and/or terms of past transactions between the merchants and customers. Alternatively, customers may inquire about a product and/or services, or about financing for a product and/or service, through a website, including entering customer information. Another example of a method for the originator to obtain customer information is through direct marketing. For example, data may be extracted from a publicly available source, such as a marketing tool, having customer data for one or more desired classes of products previously purchased by the customers. The customers may be current account holders with the originator or current customers of the originator. Moreover, the customers may have held an account with the originator in the past, or may have been past customers of the originator. Further, the customers may be new customers of the originator. The customer information is compiled 704 into a customer information database, such as database 308, using server system 302

Server system 302 uses customer data within database 308 to approve and/or pre-approve customers for participation in the method represented by processes 500 and 600 (shown in FIGS. 5 and 6). Server system 302 then uses the customer data to determine 706 a risk score for each customer. An approval is generated 708 by server system 302 based on the risk score. In an alternative embodiment, the originator may use a credit engine application communicatively coupled to server system 302 that obtains a credit check based on the customer data. The credit check may be completed using a publicly available credit checking source, such as Dun & Bradstreet. The decision to approve may be automatically decided by server system 302 or may be referred by server system 302 to an analyst at a workstation, such as workstation 418. Once a decision is reached on whether to approve a customer, the originator may notify the customer according to preselected notification settings within server system 302. The originator may send a check package to the customer, as described below. Alternatively, the originator may send a check package to the customer and also notify the customer verbally or in writing. Further, the originator may notify the customer verbally or in writing without including the check package, whether before, during, or after the approval process. If the originator received information of an approved customer from a dealer, the originator may also notify the merchant using, for example, the website the merchant used to provide the originator with the customer data.

In addition, once a customer has been approved and/or notified of being pre-approved, the server system 302 determines 710 a maximum check amount to be associated with the check. The maximum check amount is determined based on the risk score associated with the customer and/or other customer data within database 308.

In the exemplary embodiment, the originator then issues 712 a financing package to the customer, including a check and a security agreement. As described above, the check includes a plurality of security features, including physical security features, inventory control features, and bank account controls associated with the check. The check also includes a security agreement between the customer and the originator. In some embodiments, the check includes an endorsement agreement between the merchant and the originator including terms to which the merchant agrees to, such as transmitting a copy of the executed check, the security agreement, and other transaction information to the originator. In one embodiment, the check is created such that it is specific to both the customer and the merchant with whom the transaction is to take place. In one embodiment, the merchant had previously submitted to the originator customer information relating to the customer. In another embodiment, the originator obtained the customer information from publicly available resources and has partnered with a merchant in a location near to the customer. Alternatively, the originator may partner with merchants based on a negotiated price that will be made available to the customer. In another embodiment, the originator has not partnered with a merchant and, as such, the check does not specify a merchant. In such a case, the financing package includes instructions that the merchant must follow in order for the funds of the transaction to be released, including transmitting a copy of the executed check, the security agreement, and other transaction information to the originator. The check also includes an identifier that specifically identifies the goods that are to be purchased using the check by, for example, a vehicle identification number (VIN) and/or other identifier for other commercial equipment. In an alternative embodiment, the check may not include the equipment identifier. Moreover, the check includes a stale date. If the customer attempts to execute the check after the stale date has passed, the transaction may be rejected, as described further below. The originator also transmits financing package data to the originator bank, including, for example, the maximum check amount and the stale date.

After receiving the check from the originator and agreeing to a product and/or product price with the merchant, the customer executes 714 the check and the security agreement. More specifically, the customer executes the check in order to pay a purchase price of the commercial transaction between the customer and the dealer. The customer also executes the attached security agreement. Execution of the check by the customer also enters the customer into a debtor relationship with the originator, such that the customer is obligated to make regular payments to the originator based on the check amount, a percentage rate associated with the account on which the check is drawn, and/or a term of payment. The percentage rate and/or term are set by the originator, although the customer may request an amendment to the terms. Moreover, the originator may adjust the terms associated with the check prior to execution. For example, the originator may notify the customer, in the check package sent to the customer, that the customer has 60 days from the date of the package to execute the check. After the 60 day period, the originator may adjust the percentage rate due to external market adjustments, such as a prime rate adjustment.

After the check and the security agreement have been executed, the merchant transmits 716 to the originator first purchase data, including the security agreement and information relating to the transaction. For example, merchant workstation 432 transmits a scanned image of the security agreement and the transaction information to server system 302. The transaction information includes, for example, a check amount, a payee identifier, and/or an issue date of the check. The originator then transmits the first purchase data to the originator bank. Upon receiving the first purchase data, the originator bank uses originator bank server 424 to compare 718 the check amount included in the first purchase data to the maximum check amount financing package data associated with the customer. If the check amount is greater than the maximum check amount, then the originator bank generates an exception message and transmits the message to the originator. The originator may then cancel or reject 720 the transaction. Alternatively, the originator may allow the check to continue through processing based on, for example, the risk score determined for the customer to whom the check was issued. The decision whether to cancel or allow the check having a check amount exceeding the maximum check amount may be made using server system 302, and based on one or more risk settings associated with the customer and stored in database 308. The initial verification made by the originator bank facilitates preventing fraudulent activity by the merchant and/or the customer. Moreover, the initial verification facilitates preventing the customer from overextending the credit line associated with the account held by the customer at the originator bank.

When the merchant presents 722 the check at a merchant bank, the check is scanned and then progresses through an automated clearing house (ACH) process as described above in FIG. 1. The ACH also electronically transmits the electronic images to a Federal Reserve Bank, and may transmit the electronic images to additional banks, as shown in FIG. 6. The Federal Reserve Bank receives the electronically transmitted check images from the ACH and, in turn, electronically transmits the images to the originator bank or, more specifically, to originator bank server 424, as second purchase data. The originator bank then compares 724 the first purchase data to the second purchase data. For example, originator bank server 424 compares the check number included in the first purchase data to the check number included in the second purchase data. Originator bank server 424 also compares the check amount and/or the payee identifier. If one or more comparisons fail, the originator bank server 424 generates an exception message and transmits the message to server system 302 for further review by the originator. The originator may then reject 720 or may approve the transaction based on, for example, the risk score determined for the customer and/or additional customer data within database 308. Comparing the first purchase data and the second purchase data further facilitates preventing fraudulent activity by the merchant and/or customer. For example, if the merchant alters the executed check after sending the first purchase data to the originator and before presenting the check to the acquiring bank thereby generating the second purchase data, the comparison between the first purchase data and the second purchase data will alert the originator to the difference.

If the comparisons between the first purchase data and the second purchase data are positive, originator bank server 424 then compares 726 the date the check was executed by the customer to the preselected stale date. If the check execution date is later than the stale date, the transaction may be rejected 720. Alternatively, if the check execution date is later than the stale date, the transaction may still be approved by server system 302 based on, for example, the risk score determined for the customer and/or additional customer data within database 308. If each comparison is positive, originator bank server 424 clears the check and approves 728 the release of the check amount to pay the merchant. Further, after the check amount has been released to pay the merchant, the originator begins sending bills to the customer at the agreed to billing frequency and for the agreed to amount. The customer thereby repays 730 the originator according to the repayment term and interest rate specified by the originator, as described above.

The systems and methods described herein enable an approved customer to pay a dealer for a commercial financial transaction using a check that draws funds from a credit account held by an originator bank. Multiple methods of security are included to prevent fraud, such as physical security features printed on the check or embedded in the check, a check dispersal process that is controlled by the check originator, a preselected maximum check amount that may be drawn on the credit account, and a preselected stale date. In addition, once the customer has executed the check, the merchant must transmit particular check and transaction information to the originator, which then transmits the check and transaction information to the originator bank. When the merchant presents the check for payment, the check is processed as a normal check transaction until the check reaches the originator bank after having been processed by a clearing house. The originator bank compares the check information and transaction information transmitted by the merchant to the originator to the check and transaction data that has gone through the clearing house process. If the information matches the transaction is approved and the merchant is paid. The systems and methods enable both existing customers of the originator and prospective customers of the originator to use the check for commercial transactions without requiring the customers to keep such amounts of money constantly available. The originator therefore becomes more approachable to smaller business customers.

Although the systems and methods described herein are described in the context of processing commercial financial transactions, it is understood that the system components and method steps are not limited to such systems and/or methods. Likewise, the system components illustrated are not limited to the specific embodiments herein, but rather, components of the system may be utilized independently and separately from other components described herein.

While the invention has been described in terms of various specific embodiments, those skilled in the art will recognize that the invention can be practiced with modification within the spirit and scope of the claims.

What is claimed is:

1. A method for processing a commercial financial transaction between a customer and a merchant, the commercial financial transaction including a standard check used by the customer for making a purchase from the merchant, said method performed using a computer coupled to a database, said method comprising:

approving the customer electronically on the computer, by an originator, for receiving a financing package for engaging in the commercial financial transaction with the merchant;

electronically storing within the database approved customer data that is associated with the approved customer;

issuing the financing package to the approved customer from the originator;

sending the financing package to the approved customer for presentment by the approved customer to the merchant, the financing package including the standard check having a plurality of security features and a security agreement between the customer and the originator associated therewith, wherein the plurality of security features includes instructions directing the merchant to transmit first purchase data to the originator for performing an initial verification of the commercial financial transaction, the first purchase data including data representing the security agreement, the executed standard check, and a product or service purchased by the customer;

electronically storing within the database financing package data that is associated with the approved customer;

receiving, electronically at the computer, the first purchase data associated with the commercial financial transaction from the merchant, the security agreement executed by the customer establishing for the originator a security interest associated with the product or service purchased by the customer, the standard check executed by the customer establishing a financing agreement between the customer and the originator;

performing the initial verification of the commercial financial transaction electronically on the computer including comparing the financing package data to the first purchase data transmitted by the merchant; and electronically processing the commercial financial transaction if the initial verification is satisfied.

2. A method in accordance with claim 1, wherein approving the customer comprises approving the customer based on data stored in the database, the data received from at least one of a plurality of merchants, a plurality of customers, and public databases having information relating to previous transactions by the plurality of customers.

3. A method in accordance with claim 2, wherein approving the customer further comprises determining a risk score for the customer based on the data stored in the database, and wherein the approval of the customer is based on the risk score.

4. A method in accordance with claim 2, wherein approving the customer further comprises determining a maximum check amount that can be entered by at least one of the approved customer and the originator on the standard check for purchasing the product or service from the merchant.

5. A method in accordance with claim 1, wherein issuing the financing package comprises creating a financing package specific to at least one of the approved customer and the merchant, wherein the plurality of security features includes instructions directing the customer to acknowledge the security agreement.

6. A method in accordance with claim 1, wherein electronically storing financing package data within the database comprises transmitting the financing package data from the originator to an originator bank, wherein the financing package includes a maximum check amount that can be entered on the standard check for making the purchase from the merchant.

7. A method in accordance with claim 6, wherein performing the initial verification comprises transmitting the first purchase data from the originator to the originator bank, wherein the first purchase data includes a copy of the executed standard check.

8. A method in accordance with claim 7, wherein performing the initial verification further comprises:
comparing, by the originator bank, a check amount entered on the standard check for making the purchase to the maximum check amount; and
if the entered check amount is greater than the maximum check amount, transmitting an exception message from the originator bank to the originator such that the associated transaction can be further reviewed by the originator.

9. A method in accordance with claim 1, further comprising receiving second purchase data representative of the executed standard check at an originator bank after the executed standard check has been processed by the merchant and an acquiring bank used by the merchant.

10. A method in accordance with claim 9, wherein electronically processing the commercial financial transaction comprises performing a second verification of the commercial financial transaction by comparing the second purchase data to the first purchase data, wherein the second purchase data includes a copy of the executed standard check.

11. A method in accordance with claim 10, wherein performing the second verification of the commercial financial transaction comprises comparing a check amount included in the second purchase data to a check amount included in the first purchase data.

12. A method in accordance with claim 10, wherein performing the second verification of the commercial financial transaction comprises comparing an execution date included in the second purchase data to an execution date included in the first purchase data.

13. A method in accordance with claim 10, wherein performing the second verification of the commercial financial transaction comprises comparing a merchant identifier included in the second purchase data to a merchant identifier included in the first purchase data.

14. A method in accordance with claim 10, further comprising performing a third verification of the commercial financial transaction including comparing an execution date included in the second purchase data to a preselected stale date included in the financing package data.

15. A method in accordance with claim 1, further comprising paying, by the approved customer to the originator, an amount of the commercial financial transaction over a specified term at a specified interest rate.

16. A network-based system for processing a commercial financial transaction between a customer and a merchant, the commercial financial transaction including a standard check used by the customer for making a purchase from the merchant, said system comprising:
a client system;
a database for storing information; and
a server system configured to be coupled to said client system and said database, said server system configured to:
electronically prompt a user to approve the customer for receiving a financing package for engaging in the commercial financial transaction with the merchant, wherein the financing package is issued and sent to the approved customer for presentment by the approved customer to the merchant, the financing package including a standard check having a plurality of security features and a security agreement between the approved customer and an originator of the financing package, wherein the plurality of security features includes instructions directing the merchant to transmit first purchase data to the originator for performing an initial verification of the commercial financial transaction, the first purchase data including data representing the security agreement, the executed standard check, and a product or service purchased by the customer;

store within said database approved customer data that is associated with the approved customer;

store within said database financing package data that is associated with the approved customer;

receive the first purchase data associated with the commercial financial transaction from the merchant, the security agreement executed by the approved customer establishing for the originator a security interest associated with the product or service purchased by the approved customer, the standard check executed by the approved customer establishing a financing agreement between the approved customer and the originator;

perform the initial verification of the commercial financial transaction that includes a comparison of the financing package data with the first purchase data transmitted by the merchant; and process data relating to the commercial financial transaction if the initial verification is satisfied.

17. A network-based system in accordance with claim 16, wherein said server system is further configured to generate a list of approved customers based on data stored in said database, the data received from at least one of a plurality of merchants and public databases having information relating to previous transactions by the approved customers included in the list of approved customers.

18. A network-based system in accordance with claim 17, wherein said server is further configured to determine a risk score for each approved customer included in the list of approved customers based on the data stored in said database, and wherein the approval is based on the risk score.

19. A network-based system in accordance with claim 17, wherein said server is further configured to determine a maximum check amount that can be entered by at least one of the approved customer of the list of approved customers and the originator on the standard check for purchasing the product or service from the merchant.

20. A network-based system in accordance with claim 17, wherein the financing package to be issued to each approved customer included in the list of approved customers is specific to at least one of the approved customer to which the financing package is issued and the merchant, wherein the plurality of security features includes instructions directing the customer to acknowledge the security agreement.

21. A network-based system in accordance with claim 16, wherein the financing package data includes a maximum check amount that can be entered on the standard check for making the purchase from the merchant.

22. A network-based system in accordance with claim 16, wherein said server is further configured to perform the initial verification by:

comparing a check amount entered on the standard check for making the purchase to a maximum check amount stored within said database; and if the entered check amount is greater than the maximum check amount, generating an exception message such that the associated transaction can be further reviewed by the originator.

23. A network-based system in accordance with claim 16, wherein said server is further configured to receive second purchase data representative of the executed standard check after the executed standard check has been processed by the merchant and an acquiring bank used by the merchant.

24. A network-based system in accordance with claim 23, wherein said server is further configured to perform a second verification of the commercial financial transaction by comparing the second purchase data to the first purchase data, wherein the second purchase data includes a copy of the executed standard check.

25. A network-based system in accordance with claim 23, wherein said server is further configured to perform a second verification of the commercial financial transaction by comparing a check amount included in the second purchase data to a check amount included in the first purchase data.

26. A network-based system in accordance with claim 23, wherein said server is further configured to perform a second verification of the commercial financial transaction by comparing an execution date included in the second purchase data to an execution date included in the first purchase data.

27. A network-based system in accordance with claim 23, wherein said server is further configured to perform a second verification of the commercial financial transaction by comparing a merchant identifier included in the second purchase data to a merchant identifier included in the first purchase data.

28. A network-based system in accordance with claim 23, wherein said server is further configured to perform a third verification of the commercial financial transaction by comparing an execution date included in the second purchase data to a preselected stale date included in the financing package data.

29. A computer coupled to a database for processing a commercial financial transaction between a customer and a merchant, the commercial financial transaction including a standard check used by the customer for making a purchase from the merchant, said computer programmed to:

electronically prompt a user to approve the customer for receiving a financing package for engaging in the commercial financial transaction with the merchant, wherein the financing package is issued and sent to the approved customer for presentment by the approved customer to the merchant, the financing package including a standard check having a plurality of security features and a security agreement between the approved customer and an originator of the financing package, wherein the plurality of security features includes instructions directing the merchant to transmit first purchase data to the originator for performing an initial verification of the commercial financial transaction, the first purchase data including data representing the security agreement, the executed standard check, and a product or service purchased by the customer;

store within said database approved customer data that is associated with the approved customer;

store within said database financing package data that is associated the approved customer;

receive the first purchase data associated with the commercial financial transaction from the merchant, the security agreement executed by the approved customer establishing for the originator a security interest associated with the product or service purchased by the approved customer, the standard check executed by the approved customer establishing a financing agreement between the approved customer and the originator;

perform the initial verification of the commercial financial transaction that includes a comparison of the financing package data with the first purchase data transmitted by the merchant; and process data relating to the commercial financial transaction if the initial verification is satisfied.

30. A computer in accordance with claim 29, wherein said computer is further programmed to generate a list of approved customers based on data stored in said database, the data received from at least one of a plurality of merchants and public databases having information relating to previous transactions by the approved customers included in the list of approved customers.

31. A computer in accordance with claim 30, wherein said computer is further programmed to determine a maximum check amount that can be entered by at least one of the approved customer of the list of approved customers and the originator on the standard check for purchasing the product or service from the merchant.

32. A computer in accordance with claim 30, wherein the financing package to be issued to each approved customer included in the list of approved customers is specific to at least one of the approved customer to which the financing package is issued and the merchant, wherein the plurality of security features includes instructions directing the customer to acknowledge the security agreement.

33. A computer in accordance with claim 29, wherein said computer is further programmed to perform the initial verification by:

comparing a check amount entered on the standard check for making the purchase to a maximum check amount stored within said database; and if the entered check amount is greater than the maximum check amount, generating an exception message such that the associated transaction can be further reviewed by the originator.

34. A computer in accordance with claim 29, wherein said computer is further programmed to receive second purchase data representative of the executed standard check after the executed standard check has been processed by the merchant and an acquiring bank used by the merchant.

35. A computer in accordance with claim 34, wherein said computer is further programmed to perform a second verification of the commercial financial transaction by comparing the second purchase data to the first purchase data, wherein the second purchase data includes a copy of the executed standard check.

36. A computer in accordance with claim 34, wherein said computer is further programmed to perform a second verification of the commercial financial transaction by performing at least one of:

comparing a check amount included in the second purchase data to a check amount included in the first purchase data;

comparing an execution date included in the second purchase data to an execution date included in the first purchase data;

comparing a merchant identifier included in the second purchase data to a merchant identifier included in the first purchase data; and comparing an execution date included in the second purchase data to a preselected stale date included in the financing package data.

37. A non-transitory computer-readable storage medium having a computer program of instructions embodied thereon for processing a commercial financial transaction between a customer and a merchant, the commercial financial transaction including a standard check used by the customer for making a purchase from the merchant, said computer program of instructions executable by a computer for performing the steps comprising:

electronically approving the customer for receiving a financing package for engaging in the commercial financial transaction with the merchant, wherein the financing package is issued and sent to the approved customer for presentment by the approved customer to the merchant, the financing package including a standard check having a plurality of security features and a security agreement between the approved customer and an originator of the financing package, wherein the plurality of security features includes instructions directing the merchant to transmit first purchase data to the originator for performing an initial verification of the commercial financial transaction, the first purchase data including data representing the security agreement, the executed standard check, and a product or service purchased by the customer;

storing approved customer data that is associated the approved customer;

storing financing package data that is associated with the approved customer;

receiving the first purchase data associated with the commercial financial transaction from the merchant, the security agreement executed by the approved customer establishing for the originator a security interest associated with the product or service purchased by the approved customer, the standard check executed by the approved customer establishing a financing agreement between the approved customer and the originator;

performing the initial verification of the commercial financial transaction that includes a comparison of the financing package data with the first purchase data transmitted by the merchant; and processing data relating to the commercial financial transaction if the initial verification is satisfied.

38. A non-transitory computer-readable storage medium in accordance with claim 37, wherein said computer program of instructions is executable by the computer for performing the step comprising generating a list of approved customers based on data received from at least one of a plurality of merchants and public databases having information relating to previous transactions by the approved customers included in the list of approved customers.

39. A non-transitory computer-readable storage medium in accordance with claim 38, wherein said computer program of instructions is executable by the computer for performing the step comprising determining a maximum check amount that can be entered by at least one of the approved customer of the list of approved customers and the originator on the standard check for purchasing the product or service from the merchant.

40. A non-transitory computer-readable storage medium in accordance with claim 37, wherein the financing package data includes a maximum check amount that can be entered on the standard check for making the purchase from the merchant.

41. A non-transitory computer-readable storage medium in accordance with claim 37, wherein said computer program of instructions is executable by the computer for performing the step comprising performing the initial verification by:

comparing a check amount entered on the standard check for making the purchase to a maximum check amount; and if the entered check amount is greater than the maximum check amount, generating an exception message such that the associated transaction can be further reviewed by the originator.

42. A non-transitory computer-readable storage medium in accordance with claim 37, wherein said computer program of instructions is executable by the computer for performing the step comprising receiving second purchase data representative of the executed standard check after the executed standard check has been processed by the merchant and an acquiring bank used by the merchant.

43. A non-transitory computer-readable storage medium in accordance with claim 42, wherein said computer program of instructions is executable by the computer for performing the step comprising performing a second verification of the commercial financial transaction by performing at least one of:

comparing the second purchase data to the first purchase data;

comparing a check amount included in the second purchase data to a check amount included in the first purchase data;

comparing an execution date included in the second purchase data to an execution date included in the first purchase data; and comparing a merchant identifier included in the second purchase data to a merchant identifier included in the first purchase data.

44. A non-transitory computer-readable storage medium in accordance with claim 42, wherein said computer program of instructions is executable by the computer for performing the step comprising performing a third verification of the commercial financial transaction by comparing an execution date included in the second purchase data to a preselected stale date included in the financing package data.

* * * * *